United States Patent
Voss et al.

(10) Patent No.: US 8,714,519 B2
(45) Date of Patent: May 6, 2014

(54) SOLENOID VALVE, IN PARTICULAR FOR SLIP-CONTROLLED MOTOR-VEHICLE BRAKE SYSTEMS

(75) Inventors: Christoph Voss, Frankfurt (DE); Christian Schulz, Riedstadt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 229 days.

(21) Appl. No.: 13/126,019

(22) PCT Filed: Oct. 30, 2009

(86) PCT No.: PCT/EP2009/064338
§ 371 (c)(1),
(2), (4) Date: Apr. 26, 2011

(87) PCT Pub. No.: WO2010/054938
PCT Pub. Date: May 20, 2010

(65) Prior Publication Data
US 2011/0215271 A1    Sep. 8, 2011

(30) Foreign Application Priority Data
Nov. 12, 2008  (DE) .......................... 10 2008 056 854

(51) Int. Cl.
*F16K 31/02*    (2006.01)
(52) U.S. Cl.
USPC .................................. 251/129.15; 303/119.2
(58) Field of Classification Search
USPC ............. 251/129.15; 137/315.03; 303/119.1, 303/119.2
See application file for complete search history.

(56) References Cited

U.S. PATENT DOCUMENTS

| | | | | |
|---|---|---|---|---|
| 5,542,755 A | * | 8/1996 | Staib et al. | 303/119.2 |
| 6,427,972 B1 | * | 8/2002 | Kirschner | 251/129.15 |
| 6,644,623 B1 | * | 11/2003 | Voss et al. | 251/129.15 |
| 6,705,589 B2 | * | 3/2004 | Hofmann et al. | 251/129.15 |
| 6,851,659 B2 | * | 2/2005 | Zutt et al. | 251/359 |
| 7,198,334 B2 | * | 4/2007 | Katayama | 303/119.2 |
| 2007/0045581 A1 | * | 3/2007 | Yoshikawa et al. | 251/129.15 |

FOREIGN PATENT DOCUMENTS

| | | |
|---|---|---|
| DE | 19739886 A1 | 3/1999 |
| DE | 19842334 C1 | 12/1999 |
| DE | 102004001564 A1 | 8/2005 |
| DE | 102006009362 A1 | 5/2007 |
| DE | 102006004286 A1 | 8/2007 |
| DE | 102007001645 A1 | 7/2008 |
| JP | 2008106783 A | 5/2008 |
| WO | WO99/44872 A | 9/1999 |
| WO | WO02/35125 A | 5/2002 |
| WO | WO2008/110436 A | 9/2008 |

* cited by examiner

*Primary Examiner* — John K Fristoe, Jr.
*Assistant Examiner* — Ian Paquette
(74) *Attorney, Agent, or Firm* — Brinks Gilson Lione

(57) ABSTRACT

Disclosed is a solenoid valve, the valve housing of which has a thick-walled tubular body (4) for fastening in a valve receiving bore (11), which thick-walled tubular body (4) is connected to thin-walled sleeve (1). The thin-walled sleeve (1) has a radially circumferential collar (2) which makes contact with an inner shoulder (3) in the tubular body (4), and for the tubular body (4) to have a recess (5) at a radial spacing from the inner shoulder (3) The radial spacing is selected in such a way that a plastically deformable banded collar (6) remains between the inner shoulder (3) and the recess (5) on the tubular body (4). As a result, a frictional, tight connection of the tubular body (4) with the sleeve (1) is possible.

13 Claims, 2 Drawing Sheets

SOLENOID VALVE, IN PARTICULAR FOR SLIP-CONTROLLED MOTOR-VEHICLE BRAKE SYSTEMS

TECHNICAL FIELD OF THE INVENTION

The invention relates to a solenoid valve, in particular for motor vehicle brake systems with slip control.

BACKGROUND OF THE INVENTION

DE 197 39 886 A1 has already disclosed a solenoid valve of the specified type, the valve housing of which, for fixing in a valve seating bore, comprises a thick-walled tubular body, which is connected to a thin-walled sleeve, for which purpose the sleeve is pressed into an aperture in the tubular body. This measure requires the adherence to small production tolerances of the parts that have to be joined together. On the other hand, owing to the press-fit connection, the possibility cannot be excluded that an unwanted deformation and/or leak, occasioned by the radial force acting on the thin-walled sleeve, will lead to a functional impairment as a result of a deteriorating radial frictional connection.

The object of the present invention, therefore, is to design a solenoid valve of the specified type having a compact construction, which is inexpensive to produce by the simplest functional means, and to improve it in such a way that the aforementioned disadvantages are eliminated.

According to the invention this object is achieved for the solenoid valve of the specified type by placing a circumferential flange of a thin-walled sleeve on an internal step in a tubular body with an axial recess in an axial end face at a radial distance from the internal step, where the radial distance is dimensioned to leave a plastically deformable stay collar between the internal step and the recess on the tubular body, and the stay collar connects the tubular body to the sleeve. Also proposed for the achievement of the stated object is an especially advantageous method for connecting the thin-walled sleeve to a thick-walled tubular body.

Further features and advantages of the invention are set forth below in the description of two exemplary embodiments.

DETAILED DESCRIPTION OF THE DRAWINGS

Figure 1:
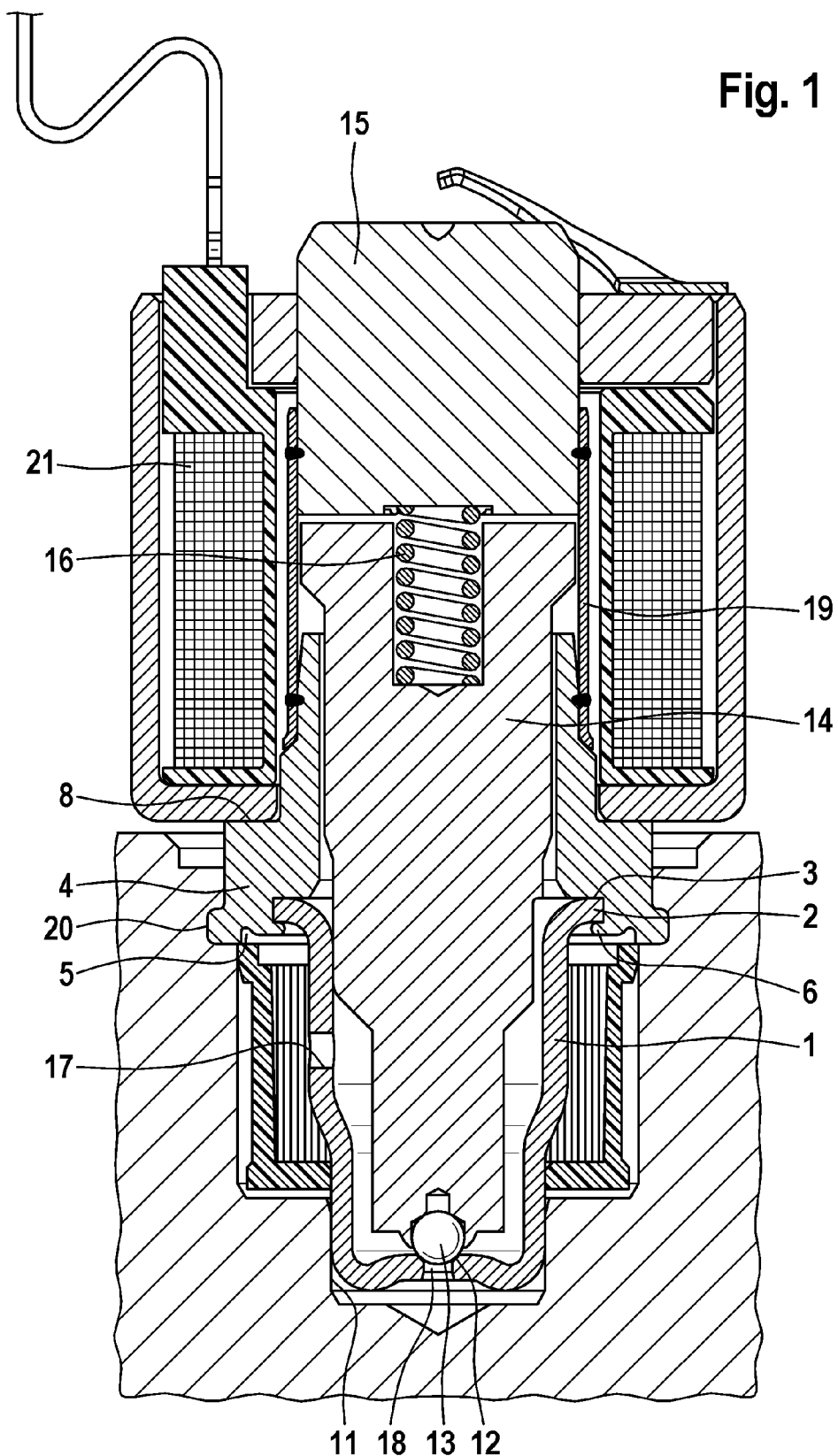
FIG. 1 shows a longitudinal cross-section of a solenoid valve, with a connection of a thin-walled sleeve to a thick-walled tubular body, for producing a multipart valve housing.

FIG. 1 shows a solenoid valve, which is preferably used for motor vehicle brake systems with slip control. The solenoid valve comprises functional elements known in the art. These include a valve closing member 13, which is arranged in a valve housing and which is capable of opening or closing a valve passage 18, having a magnet armature 14 for actuating the valve closing member 13, which is designed for relative movement in the range of a defined working stroke, and having a return spring 16, which acts on the magnet armature 14 and the spring end of which remote from the magnet armature 14 is supported on a magnetic core 15 in the valve housing. Also situated on the valve housing is a solenoid 21 for excitation of the magnet armature 14.

The solenoid valve is closed in the electromagnetically unexcited position, for which purpose the return spring 16 arranged above the magnet armature 14 presses the valve closing member 13, connected to the magnet armature 14, on to the valve seat 12, so that the valve passage 18 in the valve seat 12 is closed.

In this exemplary embodiment the magnetic core 15 is pressed as plug into an austenitic housing portion 19, which as thin-walled sleeve part is welded to the tubular body 4. Other design embodiments of the upper housing portion 19 are obviously also possible, but these are not essential for the invention.

For secure fixing in a valve seating bore 11, the valve housing comprises a thick-walled, rigid tubular body 4, which is connected to a thin-walled sleeve 1, with the particular feature that the thin-walled sleeve 1 comprises a radially circumferential flange 2, which is in axial contact with an internal shoulder 3 in the tubular body 4, with the further particular feature, essential for the invention, that the tubular body 4 comprises a recess 5 at a radial distance from the internal shoulder 3, the radial distance being selected in such a way that a plastically deformable stay collar 6, which according to FIG. 1 is plastically deformed towards the flange 2 by means of a suitable tool, is situated between the internal shoulder 3 and the recess 5 on the tubular body 4.

FIG. 1 therefore shows the stay collar 6 fully deformed radially inwards for the permanent, fluid-impervious connection of the tubular body 4 to the sleeve 1. The invention will be described in detail below with reference to FIG. 2, according to which, for specific deformation of the stay collar 6 towards the flange 2, the recess 5 is advantageously embodied as an annular groove, the groove width of which diminishes constantly in the direction of the groove base for the acutely tapering formation of the stay collar 6. This design means that a simple flat punch 7 can be used as the tool, which is simply applied axially to the stay collar 6 from above and pressed down. Prior to the deformation, therefore, the stay collar 6 has a conical contour, which at the annular face of the tubular body 4 is defined by the face recessing of a suitable tool cutting edge, which is used for producing the recess 5 exactly in the aforementioned form.

Figure 2:
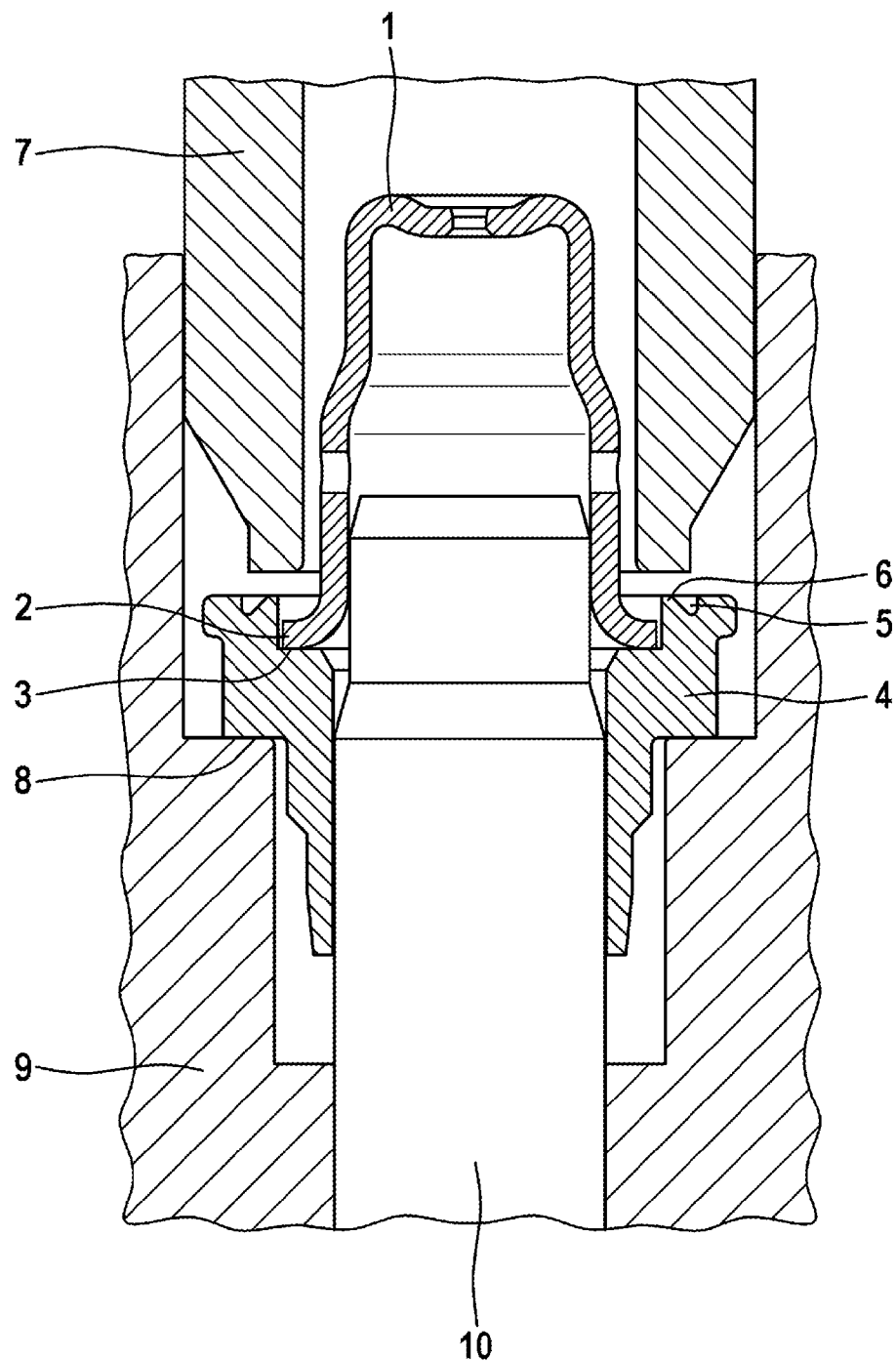
FIG. 2 shows a longitudinal cross-section of the sleeve and the tubular body during the joining process.

It can also be seen from FIG. 2 that the tubular body 4, on the end face remote from the stay collar 6, comprises an external shoulder 8, to which a steady 9 is applied for bracing an axial force occurring during the plastic deformation of the stay collar 6. In this exemplary embodiment the steady 9 extends parallel to the sleeve 1 beyond the tubular body 4, in order to guide the flat punch 7 along its inside wall towards the stay collar 6. For centering the sleeve 1 in the tubular body 4, a slight radial play is provided between the flange 2 and the internal shoulder 3, in order that the sleeve 1 can align itself on the internal shoulder 3 for self-centering it in relation to the tubular body 4 at the start of the plastic deformation of the stay collar 6 towards the flange 2. The design demonstrated here means that the plastic deformation of the stay collar 6 towards the flange 2 results in an impervious, frictional connection between the sleeve 1 and the tubular body 4, in which the radial play at the same time brings about an amazingly easy self-centering of the sleeve 1 in relation to the tubular body 4. The thereby easily and precisely established coaxial alignment of the valve housing, substantially comprising the sleeve 1 and the tubular body 4, at the same time contributes to a precise alignment of the valve seat 12 in relation to the valve closing member 13, which will be examined below.

The sleeve 1, to be exact, has the contour of a housing cup, preferably deep-drawn from thin sheet metal, the cup base of which is formed as valve seat 12 with the valve passage 18, which for smooth and wear-free functioning of the valve should always be situated as precisely as possible in the alignment of the valve closing member 13, which simply as a fixed component of the magnet armature 14 is aligned coaxially with the valve seat 12 by the most precise possible guiding of the magnet armature 14 inside the valve housing. At the same time the radially outward offset edge of the housing cup assumes the function of the flange 2, which is likewise produced by deep-drawing.

The sleeve 1 is composed of a hardened, ferritic material, in order to be able to make the valve seat 12, produced by the deep-drawing method, as wear-free as possible. The valve passage 18 located in the valve seat 12 and the passage 17 located in the wall of the sleeve 1 can be inexpensively produced by the punching or stamping method.

The contour of the tubular body 4, on the other hand, is produced by cold upsetting or cold extrusion from a steel blank, which like the sleeve 1 has a ferritic material grain structure for optimization of the magnetic circuit. The tubular body 4 moreover comprises a retaining collar 20, which extends on a level with the stay collar 6 along the outer circumference of the tubular body 4, so that a fixed and tight connection is established between the tubular body 4 and the valve seating bore 11 by means of an external caulking of the housing material in the area of the valve seating bore 11. Furthermore, in addition to the cold upsetting or cold extrusion of the steel blank, the internal shoulder 3, the recess 5 and the stay collar 6 are produced exactly on the tubular body 4 by metal-cutting workpiece machining.

The production of the multipart valve housing is based on a method for connecting a thick-walled tubular body 4 to a thin-walled sleeve 1, according to the following steps:

supporting of the tubular body 4 in the area of its external shoulder 8 on a steady 9, insertion of a precisely fitting assembly mandrel 10 into the tubular body 4 until the assembly mandrel 10 projects by a length from a stay collar 6 located on the tubular body 4, placement of the sleeve 3 on to the projecting length of the assembly mandrel 10 and insertion of the sleeve 3 into the tubular body 4 until a flange 2 on the sleeve 3 comes into axial contact with an internal shoulder 3 in the tubular body 4, withdrawal of the assembly mandrel 10 from the tubular body 4, and plastic deformation of the stay collar 6 towards the flange 2 through axial pressing down of the stay collar 6 by means of a flat punch 7.

As will have become apparent from the preceding description of the solenoid valve, predominantly ferritic components are used for the valve housing, the virtually complete exclusion of austenitic components serving to increase the efficiency of the magnetic circuit considerably. In the past this has had the unwanted consequence that without suitable precautions the so-called sticking of the magnet armature 14 to the magnetic core 15 on termination of the electromagnetic excitation could be exacerbated, for which reason the return spring 16 is now designed in such a way that even in the currentless, closed state of the valve its spring force is slightly increased in comparison to previous designs and in the electromagnetically opened state is increased in such a way that on cessation of the electromagnetic excitation the magnet armature 14 can be immediately released from the magnetic core 15 due to the intensified action of the return spring 16, for undelayed closure of the valve. The thereby somewhat stiffer design of the return spring 15 constitutes a simple, inexpensive measure, instead of the additional use of a "non-stick disk" between the magnet armature 14 and the magnetic core 15.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A solenoid valve comprising a valve housing with a valve passage; a valve closing member arranged in the valve housing and configured to open or close the valve passage; an electromagnet armature for actuating the valve closing member, the electromagnet armature being configured for relative movement in a range of a defined working stroke; a return spring acting on the electromagnet armature and having a spring end remote from the electromagnet armature and supported on a magnetic core in the valve housing, the valve housing comprising a thick-walled tubular body for fixing in a valve seating bore, the tubular body being connected to a thin-walled sleeve having a radially circumferential flange, the circumferential flange being in contact with an internal step in the tubular body, the tubular body having an axial annular groove with a groove bottom, the groove having a width continuously diminishing toward the groove bottom and a radially inner groove wall forming an acute angle with a cylindrical axis of the tubular body, the annular groove separating an axial radially outer end face from an axial radially inner end face at a radial distance from the internal step, at least the radially inner end face extending in a radial plane, the radial distance being dimensioned to leave a stay collar forming the radially inner end face between the internal step and the axial annular groove on the tubular body, the stay collar connecting the tubular body to the sleeve, wherein the radially inner end face is axially offset from the from the radially outer end face, and wherein the stay collar is axially positioned between the circumferential flange of the sleeve and the valve closing member.

2. The solenoid valve as claimed in claim 1, further comprising that the stay collar extends substantially equally radially inward along the circumference of the flange and self-centers the flange in relation to the tubular body.

3. The solenoid valve as claimed in claim 1, further comprising that the sleeve is composed of a ferritic material harder than the stay collar.

4. The solenoid valve as claimed in claim 1, further comprising that the sleeve is a deep-drawn part consisting of thin sheet metal and having a contour of a housing cup with a bottom forming a valve seat and having a hole forming the valve passage.

5. The solenoid valve as claimed in claim 1, further comprising that the tubular body is a part made of ferritic material by cold upsetting or cold extrusion from a steel blank, and that the internal step, the recess and the stay collar are produced by metal-cutting workpiece machining.

6. The solenoid valve as claimed in claim 1, further comprising that the stay collar is plastically deformed toward the flange by applying an axial force to the stay collar via a flat punch.

7. The solenoid valve as claimed in claim 6, further comprising that the axial force is applied with a flat punch.

8. The solenoid valve as claimed in claim 6, further comprising that the stay collar forms an impervious, positively interlocking connection between the sleeve and the tubular body.

9. A solenoid valve comprising a valve housing with a valve passage; a valve closing member arranged in the valve housing and configured to open or close the valve passage; an electromagnet armature for actuating the valve closing member, the electromagnet armature being configured for relative movement in a range of a defined working stroke; a return spring acting on the electromagnet armature and having a spring end remote from the electromagnet armature and supported on a magnetic core in the valve housing, the valve housing comprising a thick-walled tubular body for fixing in a valve seating bore, the tubular body being connected to a thin-walled sleeve having a radially circumferential flange, the circumferential flange being in contact with an internal step in the tubular body, the tubular body having an axial recess in an axial end face at a radial distance from the internal step, the radial distance being dimensioned to leave a stay collar between the internal step and the recess on the tubular body, the stay collar connecting the tubular body to the sleeve, further comprising that the tubular body has an external step on an end face remote from the stay collar, the external step being configured to abut a steady for bracing an axial force deforming the stay collar.

10. A method for connecting a valve housing having a thick-walled tubular body and a thin-walled sleeve of a solenoid valve having a valve housing with a valve passage; a valve closing member arranged in the valve housing and configured to open or close the valve passage; an electromagnet armature for actuating the valve closing member, the electromagnet armature being configured for relative movement in a range of a defined working stroke; a return spring acting on the electromagnet armature and having a spring end remote from the electromagnet armature and supported on a magnetic core in the valve housing, the valve housing comprising a thick-walled tubular body for fixing in a valve seating bore, the tubular body being connected to a thin-walled sleeve having a radially circumferential flange, the circumferential flange being in contact with an internal step in the tubular body, the tubular body having an axial recess in an axial end face at a radial distance from the internal step, the radial distance being dimensioned to leave a stay collar between the internal step and the recess on the tubular body, the stay collar connecting the tubular body to the sleeve, the method comprising the steps of:

supporting the tubular body at an external step on a steady;

inserting an assembly mandrel into the tubular body until the assembly mandrel projects from the stay collar by specified length;

placing the sleeve onto the projecting length of the assembly mandrel;

inserting the sleeve into the tubular body until the flange on the sleeve comes into axial contact with the internal step in the tubular body;

withdrawing the assembly mandrel from the tubular body; and applying an axial force on the stay collar, the axial force plastically deforming the stay collar toward the flange.

11. The method as claimed in claim 10, further comprising that a slight radial play between the flange and the internal step is configured to center the sleeve in the tubular body.

12. The method as claimed in claim 10, further comprising that the axial force is applied by a flat punch.

13. The method as claimed in claim 10, wherein the step of plastically deforming the stay collar first aligns the sleeve in a central position in the tubular body and then positively interlocks the tubular body and the sleeve.

* * * * *